United States Patent [19]

Buschur

[11] Patent Number: 5,304,936
[45] Date of Patent: Apr. 19, 1994

[54] ELECTRICAL WATER DROP SENSOR WITH VARYING GAP WIDTH

[75] Inventor: Jeffrey J. Buschur, Bellbrook, Ohio

[73] Assignee: General Motors Corporation, Detroit, Mich.

[21] Appl. No.: 82,146

[22] Filed: Jun. 24, 1993

Related U.S. Application Data

[63] Continuation of Ser. No. 811,424, Dec. 20, 1991, abandoned.

[51] Int. Cl.$^5$ .............................................. B60S 1/08
[52] U.S. Cl. ........................... 324/689; 324/687; 324/690; 324/694; 318/483; 73/304 C
[58] Field of Search ............. 318/483, 478; 73/304 C; 361/278, 286; 324/689, 687, 690, 694, 664

[56] References Cited

U.S. PATENT DOCUMENTS

| | | |
|---|---|---|
| 1,482,448 | 2/1924 | Sullivan . |
| 2,407,215 | 9/1946 | Anderson . |
| 3,555,289 | 1/1970 | Sobkow . |
| 3,596,517 | 3/1971 | Ryder ........................ 73/304 C |
| 3,649,898 | 3/1972 | Inoue . |
| 3,794,847 | 2/1974 | Cadiou . |
| 4,010,383 | 3/1977 | Grassmann . |
| 4,131,834 | 12/1978 | Blaszkowski . |
| 4,499,410 | 2/1985 | Iacoponi ........................ 318/483 |
| 4,639,831 | 1/1987 | Iyoda ........................... 324/689 |
| 4,665,351 | 5/1987 | Nyberg . |
| 4,689,536 | 8/1987 | Iyoda ........................... 318/483 |
| 4,705,998 | 11/1987 | Millerd et al. . |
| 4,710,878 | 12/1987 | Iyoda . |
| 4,740,735 | 4/1988 | Hayashi ......................... 318/483 |
| 4,797,605 | 1/1989 | Palanisamy ...................... 318/483 |
| 4,814,690 | 3/1989 | Melcher ......................... 324/687 |
| 4,827,198 | 5/1989 | Mueller et al. . |
| 4,831,493 | 5/1989 | Wilson et al. . |
| 4,846,869 | 7/1989 | Palanisamy . |
| 4,897,585 | 1/1990 | Millerd ......................... 318/483 |
| 4,916,374 | 4/1990 | Schierbeek ..................... 318/483 |
| 5,119,002 | 6/1992 | Kato ............................ 318/483 |

FOREIGN PATENT DOCUMENTS

| | | |
|---|---|---|
| 2229974 | 1/1974 | Fed. Rep. of Germany . |
| 2255264 | 5/1974 | Fed. Rep. of Germany . |
| 62-247238 | 4/1988 | Japan . |

Primary Examiner—Kenneth A. Wieder
Assistant Examiner—Jose M. Solis
Attorney, Agent, or Firm—Robert M. Sigler

[57] ABSTRACT

A water drop sensor comprises a pair of electrodes disposed in association with a portion of a surface of a vehicle window within a wipe pattern and having edges defining an extended insulating gap between the electrodes. The electrodes define a gap which varies in width over the range of diameters of drops to be sensed. The result is that the sensor shows more sensitivity to larger drops than to smaller drops as compared with a similar sensor having a constant gap width. The variation in gap width may be continuous or stepwise over the total range of drop diameters.

4 Claims, 3 Drawing Sheets

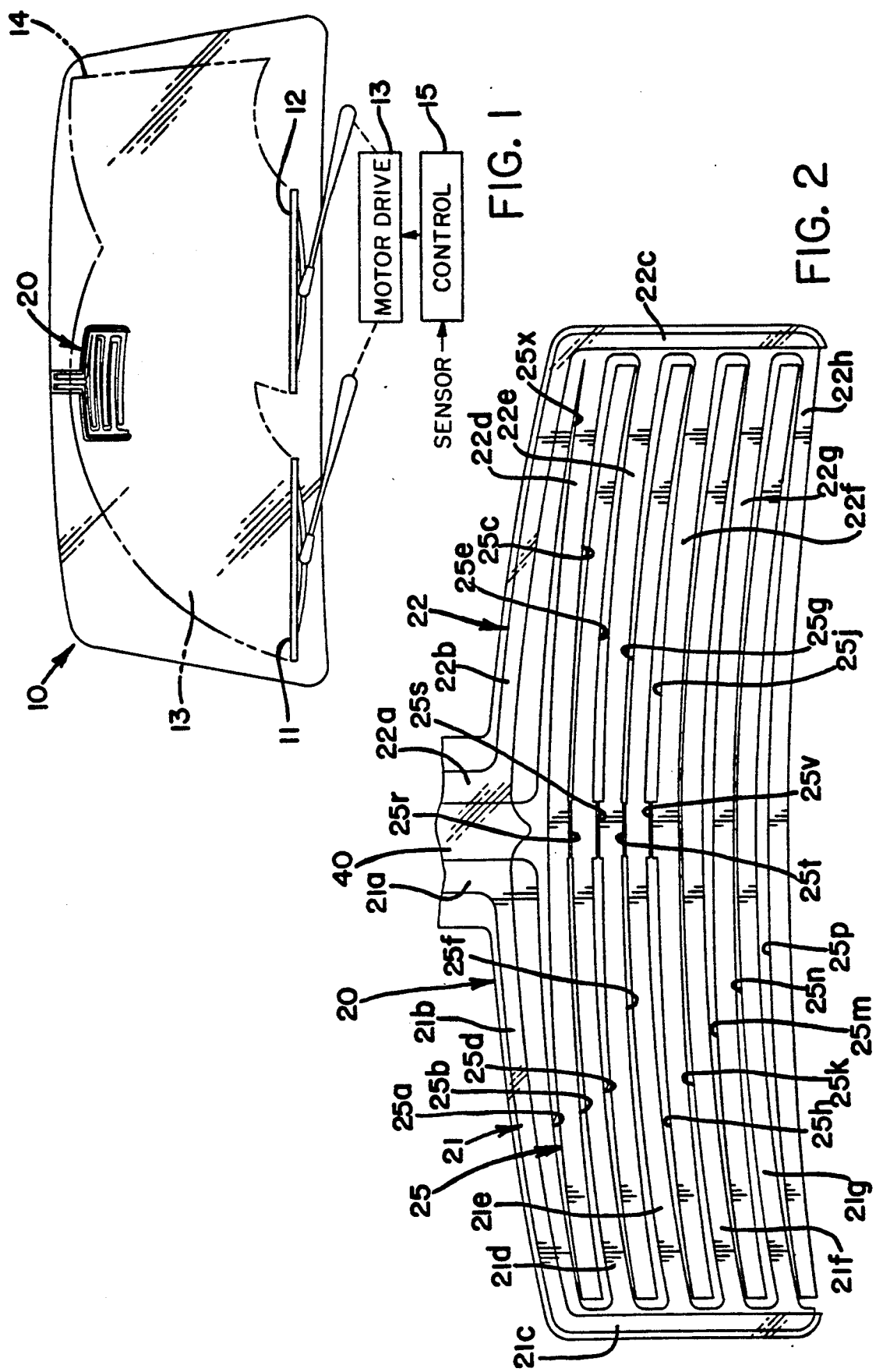

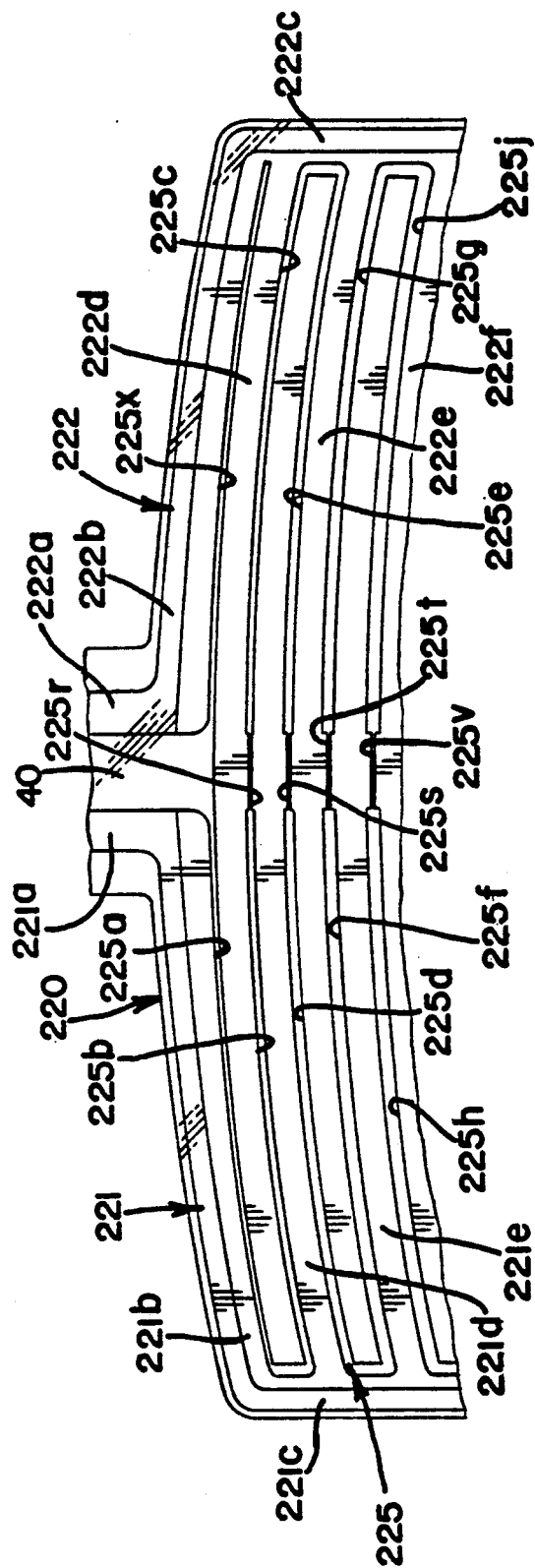

ELECTRICAL WATER DROP SENSOR WITH VARYING GAP WIDTH

This application is a continuation of U.S. Ser. No. 07/811,424, now abandoned filed on Dec. 20, 1991.

BACKGROUND OF THE INVENTION

This invention relates to a water drop sensor for a motor vehicle window, and particularly to such a sensor having electrically conducting electrodes separated by an insulating gap which may be spanned by a water drop. The prior art shows many examples of such sensors, which may be resistive, in which case the electrodes are placed on the outer surface of the window to be contacted directly by water drops, or capacitive, in which case the electrodes are separated from the water drops by a dielectric coating or a layer of glass so that the capacitance between the electrodes is changed by the water drops. In either case, however, an electrical parameter (resistance, capacitance) is varied by water drops on the window which overlap both electrodes. If such a sensor is placed within the wipe pattern of a vehicle window wiper system, it may be used for automatic control of wiper operation.

Sensors of this type as shown in the prior art have been shown to operate successfully at a basic level, in that they are able to distinguish between the presence or absence of moisture on the windshield and are able to activate and deactivate wiper operation or vary the wipe cycle rate or wiper speed in some manner dependent on the amount of moisture on the windshield glass in the vicinity of the sensor. The prior art shows such sensors with conducting electrodes comprising, among other materials, transparent tin oxide affixed to the windshield glass, within the wiper pattern so as to be cleared of moisture with each wipe cycle but generally located in a portion of the wipe pattern out of the main sight lines so as to minimize the visibility thereof to the vehicle occupants.

However, such prior art sensors, although operable on a basic level, have not been sufficiently sophisticated to provide optimal wiper control in a commercial product. Such prior art sensors provide a gap between the electrodes of constant width. When used for wipe cycle or speed control, such sensors exhibit decreasing sensitivity as water drop size increases, so that a larger area of windshield must be covered with precipitation to produce a given probability of sensing the precipitation. This appears to be due at least partly to the fact that the surface area of a generally circular water drop on a window increases as the square of the diameter, so that a large diameter drop is more noticeable to a vehicle occupant than a smaller diameter drop, whereas the ability to bridge the insulating gap increases only directly with the diameter.

This decrease in sensitivity with increasing drop size, for a prior art sensor with constant gap width, is illustrated in FIG. 3, wherein curves 30–32 show the percent glass coverage required to detect a predetermined number (1, 3, 8, respectively) of water drops as a function of drop diameter on the windshield. Curves 30–32 slope upward with increasing drop size, which shows that a greater portion of the window must be covered to detect the same number of drops. Thus, the upward slope of curves 30–32 means that the sensitivity of the sensor decreases with increasing drop diameter. However, one or more drops may fall on the window in the driver's line of sight before a detectable drop falls on the sensor; and each such drop affects an area of the window proportional to its area on the window. Thus, many vehicle operators would prefer a wiper control in which the sensitivity increases with increasing drop size, or at least in which the decrease in sensitivity with increasing drop size is reduced.

SUMMARY OF THE INVENTION

It is therefore an object of this invention to provide a water drop sensor for a vehicle window providing at least a reduction in the decrease in sensitivity, and preferably an increase in sensitivity, with increasing drop size on the window.

The invention is a water drop sensor comprising a pair of electrodes disposed in association with a portion of the outer surface of a vehicle window surface within the wipe pattern and having edges defining an extended insulating gap between the electrodes. The electrodes define a gap which varies in width over the diameters of drops to be sensed. The result is that the sensor increases in sensitivity with drop diameter. The variation in gap width may be continuous or stepwise over the total range of drop diameters. The improved response is a characteristic of the sensor itself and thus simplifies the wiper control apparatus.

SUMMARY OF THE DRAWINGS

FIG. 1 shows a motor vehicle windshield with windshield wipers and a water drop sensor according to the invention.

FIG. 2 shows an enlarged view of the sensor of FIG. 1.

FIGS. 5 and 6 show alternate embodiments of water drop sensors according to the invention.

DESCRIPTION OF A PREFERRED EMBODIMENT

Figure 3:
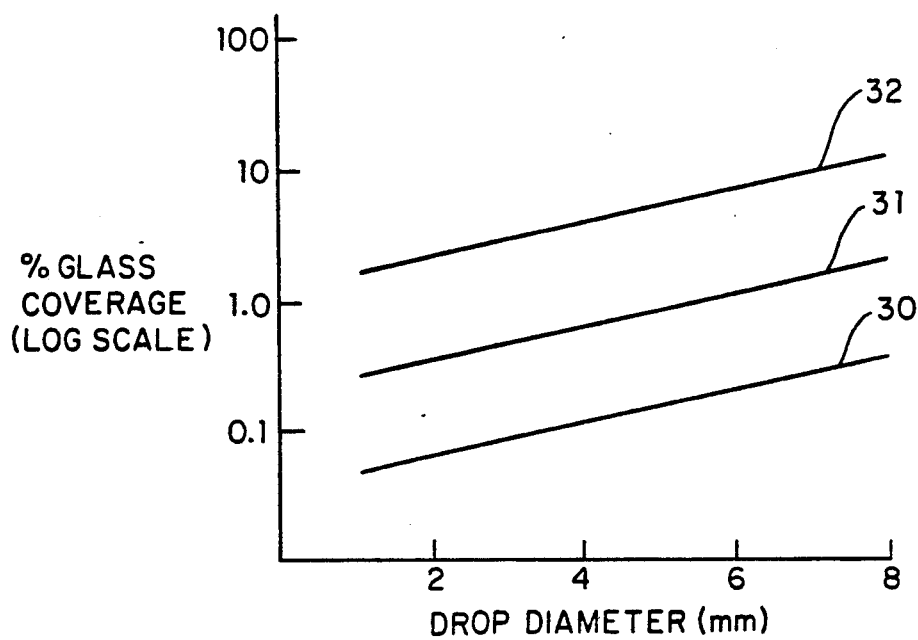
FIG. 3 shows a graph of percent glass coverage vs. drop diameter for water drops on a windshield for a prior art resistive sensor with constant gap width.

Referring to FIG. 1, a motor vehicle window, in particular a windshield 10, is provided with a pair of window or windshield wipers 11 and 12, which may be driven by an electric motor drive 13 including any known gear and/or linkage apparatus so as to sweep from an inner wipe position as shown through a wipe area 13, defined by a broken line 14, to an outer wipe position and back in repeated cycles. Wiper motor drive 13, which may comprise a single or plural wiper motors, may be controlled by an electronic control 15 so as to provide intermittent operation with a variable delay between wipe cycles; and many such controls are known. The cycle rate of the wipers is variable, either by variation of the speed of electric motor drive 13 for a variable wiper speed or by alternate activation and deactivation of electric motor drive 13 for intermittent operation. Variable cycle rate may further include fully automatic operation by turning the electric motor drive on when sufficient water is detected and off when water is no longer detected on windshield 10.

Windshield 10 is provided with a water drop sensor 20 indicated schematically in FIG. 1. Sensor 20 is located within wipe area 13 and preferably near the top center thereof, where it will not be in the driver's direct field of vision during driving and it may be partially hidden by a normally placed vehicle internal rear view mirror. Sensor 20 is shown in detail in FIG. 2 at a larger scale. It comprises a pair of electrodes 21 and 22 each made of a coating of transparent, electrically conducting tin oxide on the outer surface of windshield 10. The edges of the electrodes may further define a gap which comprises an arc similar to the arc of a point on the wiper blade moving across the windshield so as to reduce streaking and/or damage across the gap. At least one embodiment of the sensor may be made by coating the entire windshield with electrically conductive material and removing material to form the gap, which significantly reduces cost. Of course, although the curved sensors shown are preferred, the invention further contemplates sensors with straight electrodes.

Electrode 21 has a vertical lead portion 21a, a half length horizontal extending portion 21b, a vertical edge connecting portion 21c and a plurality of substantially parallel full length horizontal fingers 21d-21g. Electrode 22 similarly has a vertical lead portion 22a, a half length horizontal extending portion 22b, a vertical edge connecting portion 22c and a plurality of substantially parallel full length horizontal fingers 22d-22h. The fingers of electrodes 21 and 22 project between each other in an interdigital manner. For example, finger 22d of electrode 22 projects from vertical edge connecting portion 22c toward vertical edge connecting portion 21c between half length horizontal extending portion 22b and finger 21d of electrode 21 and extends between half length horizontal extending portion 21b and finger 21d. Finger 22e of electrode 22 projects similarly between fingers 21d and 21e of electrode 21; finger 22f extends between fingers 21e and 21f; and finger 22g extends between fingers 21f and 21g, the latter of which extends from vertical edge connecting portion 21c between fingers 22g and 22h.

The result is that electrodes 21 and 22 define between them an extended gap 25 having a plurality of portions. For example, gap portion 25a is defined between half length horizontal extending portion 21b of electrode 21 and finger 22d of electrode 22; gap portions 25b and 25c are defined between the left and right sides, respectively, of fingers 22d and 21d; and gap portions 25d and 25e are defined between the left and right sides, respectively, of fingers 21d and 22e. In addition, gap portions 25f and 25g are defined between the left and right sides of fingers 22e and 21e; gap portions 25h and 25j are defined between the left and right sides, respectively, of fingers 21e and 22f; and gap portion 25k is defined between fingers 22f and 21f. Furthermore, gap portion 25m is defined between fingers 21f and 22g; gap portion 25n is defined between fingers 22g and 21g; and gap portion 25p is defined between fingers 21g and 22h. Finally, several short gap portions 25r, 25s, 25t and 25v are formed in the center between finger pairs 22d/21d, 21d/22e, 22e/21e and 21e/22f, respectively. Although a gap 25x is formed between half length horizontal extending portion 22b and finger 22d, this portion does not contribute to the sensor, since it is a gap between two portions of the same electrode 22. It is included only for appearance and convenience of manufacture and could be eliminated if desired by merging the portions of electrode 22 which define it.

The half length horizontal extending portions 21b and 22b and the horizontally extending fingers 21d-g and 22d-h are all slightly curved to generally follow the arc of the wiper blade 11 which wipes across sensor 20. However, the curvature of the elements of electrode 21 is slightly greater than the curvature of the elements of electrode 22. The result is that each of gaps 25a-p has a width, or distance between the electrodes defining it, which varies continuously along the gap. The maximum gap width may be, for example, 3.7 mm; while the minimum gap width may be 1.1 mm. A larger sensor could provide a larger maximum gap width; but the minimum gap width is a result of practical limitations in the mass production techniques for applying tin oxide to windshield 10. As the state of the art in such processes advances, the minimum gap width of the continuously varying portion of the sensor might decrease.

The reason for the varying gap width is to provide a sensor output with greater sensitivity to water drops on the window of larger sizes. A single large drop on the window has been found to be more annoying to many vehicle operators attempting to look past it than many small drops. In a gap bridging resistive or capacitive sensor, the gap bridging effect of water drop size increases with the diameter of the drop on the window. However, the area of window affected by that water drop increases at a faster rate, closer to the square of the water drop diameter. A gap bridging sensor is generally provided with a constant gap width on the order of the diameter of the smallest water drops to which it is to respond. Assuming that a water drop has an equal chance of falling on any point on the sensor, the chance of it bridging the constant gap is proportional to the area formed by the drop centers of all water drop locations in which the water drop bridges the gap.

For a constant gap width, such an area will be a rectangle which grows with drop diameter only in one dimension (across the gap). This produces a response as shown in the curves 30-32 of FIG. 3, which shows a graph of percent glass coverage vs. drop diameter for water drops on a windshield with a resistive sensor having a constant gap width. The sensitivity of the sensor decreases as the required percent glass coverage increases. Thus, as previously discussed, for a given number of detected water drops, the sensitivity of the sensor decreases with increasing drop diameter.

Figure 4:
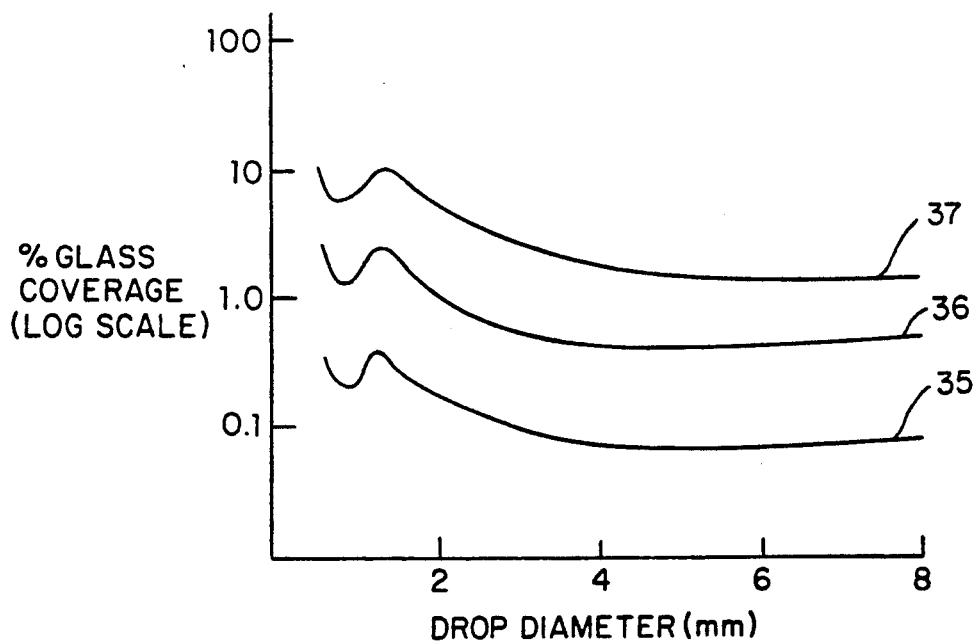
FIG. 4 shows a graph of percent glass coverage vs. drop diameter for water drops on a windshield for a the sensor of FIGS. 1 and 2.

However, for a varying gap width, such an area will be a triangle which grows with drop diameter in both width (across the gap) and height (along the gap) simultaneously. Thus, the chance of detection of a water drop with a varying gap width increases with the area of the triangle, which is a faster rate with drop diameter than the chance of detection with a constant gap width. This can be seen in curves 35-37 of FIG. 4, which are similar to those of FIG. 3 except that the sensor is that of FIG. 2, with a continuously varying gap width from 1 to 3.7 mm. The portion of each curve in this range of gap width shows precisely the opposite slope, which indicates sensitivity increasing with drop size in this range. If the range of gap width were extended beyond 3.7 mm, the range of this slope would be similarly extended. Even in the curves as shown, the range of the curves above 3.7 mm shows a lower decrease in sensitivity than the similar portions of curves 30-32.

Since practical manufacturing considerations limit the variation in sensor gap width for the tin oxide coating applied to windshield 10 to widths above 1 mm, gap portions 25r-v of much smaller width are formed after application of the tin oxide by coating removal through scoring or similar means to provide response to drops of smaller diameter. Gaps 25r-v are responsible for the response below 1 mm in curves 35-37 of FIG. 4. They are most useful in detecting the small drops of fine mist. As such, they need not cover a large area of the windshield, since such fine mist tends to cover the entire windshield when it occurs and an occupant is generally tolerant of some degree of such fine mist before requiring windshield wiper operation. Clearly, however, advances in manufacturing techniques allowing smaller gaps within the coating process could render these short gap portions and the extra steps required for their formation unnecessary.

In the case of a resistive sensor 20, a transparent insulating coating 40 may be applied over vertical lead portions 21a of electrode 21 and 22a of electrode 22 to prevent the continuous shorting of electrodes 21 and 22 outside wipe area 13, where wiper blades 11 and 12 do not clean away water drops during each wipe cycle. This coating 40 may be continued over the outer edge of half length horizontal extending portions 21b and 22b and vertical edge connecting portions 21c and 22c to provide additional abrasion protection for these connecting portions of the sensor. The exposed portions of lead portions 21a and 22a are, of course, separated sufficiently that they are unlikely to cause a water drop detection before some other part of the sensor. A capacitive sensor does not require additional insulation from the water but may include such a coating to reduce the contribution of the vertical lead members to sensor capacitance. Vertical lead portions 21a and 22a provide connection to electrical circuit apparatus for sensing the resistance or capacitance between electrodes 21 and 22 to detect the presence of water drops.

Another embodiment of the sensor of this invention is shown in FIG. 5. Only a portion of this sensor 120 is shown, since the structure of the remainder will be clear from that shown and the description of the sensor of FIG. 2. Sensor 120 comprises a pair of electrodes 121 and 122 similar in material, location, structure, shape and size to electrodes 21 and 22 of FIG. 2 except that the horizontally extending portions and fingers defining gap 125 vary in a stepwise, rather than a continuous, manner. It is only necessary for one surface of each portion of gap 125 to be stepped; the other surface may be straight and smooth. There may be, for example, five different gap widths distributed across the range of 1.1 mm to 3.7 mm. In any case, there is a sufficient number of step sizes, and the step sizes are sufficiently distributed in gap length across the total range, that gap 125 approximates the continuously varied width of gap 25 in the embodiment of FIG. 2. The short gap portions 125r, 125s, 125t and 125v are identical with the similarly numbered short gap portions of FIG. 2. Once again, gap portion 125x does not contribute to sensor operation and could be eliminated. Thus, the sensor of FIG. 5 will provide essentially the same performance as that shown in curves 35-37 of FIG. 4.

Another embodiment of the sensor of this invention is shown in FIG. 6. As with sensor 120 of FIG. 5, only a portion of this sensor 220 is shown in FIG. 6. Sensor 220 comprises a pair of electrodes 221 and 222 similar in material, location, structure, shape and size to electrodes 21 and 22 of FIG. 2 except that each of the horizontally extending portions or fingers has smooth edges to define a constant gap width. However, the widths of the gap portions increase from one to the next proceeding downward from the top of the sensor. For example, gap portion 225a defined between horizontally extending portion 221b and finger 222d of constant width (such as 1.1 mm), is the narrowest. The next lower gap portions 225b and 225c, may have an equal constant slightly greater width (such as 1.4 mm); and the increase in gap width may continue with lower gap portions to the largest gap, at the bottom of the sensor and therefore not shown, having a width near 3.7 mm. Of course, alternative arrangements are possible. For example, each of the half length gap portions such as 225a-225j may be a different gap width to increase the number of different widths. In addition, the order of size variation with gap portion may be different. There is a sufficient number of gap portions of different width, and they are sufficiently distributed in gap length, that gap 225 approximates the continuously varied width of gap 25 in the embodiment of FIG. 2. The short gap portions 225r, 225s, 225t and 225v are identical with the similarly numbered short gap portions of FIG. 2. Thus, the sensor of FIG. 6 will provide essentially the same performance as that shown in curves 35-37 of FIG. 4.

It will be apparent to those of ordinary skill in the art that, within the spirit and claims of this invention, the stepwise and continuous gap variation techniques illustrated in the embodiments of FIGS. 2, 5 and 6 may be combined in a single sensor to produce a great number of equivalent variations. Some gap portions may be continuously varied, some may be stepwise varied, some may be of constant width and some may combine the techniques in a single gap portion, as long as the gap widths vary across the range of drop diameters to be measured and there is a sufficient number of different gap widths to approximate a continuous variation.

The embodiments of the invention in which an exclusive property or privilege is claimed are defined as follows:

1. A vehicle window mounted electrical sensor for sensing rain drops of diameter on the outer surface thereof varying through a range of diameters of substantially 1 to 3 millimeters typical of rain drops, the sensor having a resistance suitable for cycle rate control of a window wiper system effective to repeatedly cycle a wiper element through a wipe area on the window with the cycle rate a function of the varying rain drop size, the sensor comprising a pair of adjacent electrically conducting electrodes insulated from each other and disposed in association with a portion of a surface of the vehicle window within the wipe area, one of the pair of electrodes comprising a first vertical lead portion extending downward over a top middle portion of the window into the wipe area, a first half length horizontal extending portion extending from a lower end of the first vertical lead portion horizontally toward a first side of the window, a first vertical edge connecting portion extending downward from an outer end of the first half length horizontal extending portion and a first plurality of vertically spaced fingers extending from the first vertical edge connecting portion horizontally toward a second side of the window past the center of the window, the other of the pair of electrodes comprising a second vertical lead portion extending downward over a top middle portion of the window into the wipe area parallel to the first vertical lead portion, a second half length horizontal extending portion extending from a lower end of the second vertical lead portion horizontally toward the second side of the window, a second vertical edge connecting portion extending downward from an outer end of the second half length horizontal extending portion and a second plurality of vertically spaced fingers extending from the second vertical edge connecting portion horizontally toward the first side of the window past the center of the window and being interdigitated with the first plurality of vertically spaced fingers, the first plurality of vertically spaced fingers having a first radius of curvature and the second plurality of vertically spaced fingers having a second radius of curvature different from the first radius of curvature such that adjacent ones of the first plurality of vertically spaced fingers and the second plurality of vertically spaced fingers define gaps varying in width from each horizontal end thereof to the middle of the window at least between 1 and 3 millimeters but much smaller than their length, the first and second radii of curvature being substantially similar to that of a line traced by a point on the wiper element during a wipe cycle, whereby the sensitivity of the sensor increases with water drop diameter within the range of diameters.

2. The sensor of claim 1 further comprising a transparent, electrically insulating and abrasion reducing coating provided over the first and second vertical lead portions outside the wipe pattern to prevent electrical conduction therebetween and over portions of the first and second half length horizontal portions and first and second vertical edge connecting portions to ensure unbroken conducing paths to the first and second pluralities of vertically spaced fingers.

3. The sensor of claim 1 in which short adjacent portions of adjacent ones of the first and second pluralities of vertically spaced fingers increase in vertical width to modify one or more short portions of the gap by providing a gap width therein substantially smaller than 1 millimeter so as to be bridged by droplets of mist thereacross.

4. The sensor of claim 2 in which short adjacent portions of adjacent ones of the first and second pluralities of vertically spaced fingers increase in vertical width to modify one or more short portions of the gap by providing a gap width therein substantially smaller than 1 millimeter so as to be bridged by droplets of mist thereacross.

* * * * *